United States Patent
Konishi et al.

(10) Patent No.: US 6,383,246 B1
(45) Date of Patent: May 7, 2002

(54) COMPOSTING ACCELERATOR FOR PLANT-DERIVED MATERIAL

(75) Inventors: Ryoichi Konishi; Ken Kanzaki; Kenzo Okada, all of Tsukuba (JP)

(73) Assignee: Nisshin Flour Milling Inc., Tokyo (JP)

( * ) Notice: Subject to any disclaimer, the term of this patent is extended or adjusted under 35 U.S.C. 154(b) by 0 days.

(21) Appl. No.: 09/599,445

(22) Filed: Jun. 22, 2000

(51) Int. Cl.$^7$ .................. C05F 11/08; C05F 11/02
(52) U.S. Cl. .................. 71/6; 71/13; 71/14; 71/23
(58) Field of Search .................. 71/6, 11, 12, 13, 71/14, 15, 23, 24

(56) References Cited

U.S. PATENT DOCUMENTS

| | | | | | |
|---|---|---|---|---|---|
| 4,249,929 A | * | 2/1981 | Kneer | .............................. | 71/9 |
| 5,256,711 A | * | 10/1993 | Tokiwa et al. | ................. | 524/47 |
| 5,393,317 A | * | 2/1995 | Robinson | ........................ | 71/12 |
| 5,549,890 A | * | 8/1996 | Kubo | ..................... | 424/93.462 |
| 5,772,721 A | * | 6/1998 | Kazemzadeh | ................... | 71/11 |

FOREIGN PATENT DOCUMENTS

JP     P2000-154083 A     6/2000

* cited by examiner

*Primary Examiner*—Steven P. Griffin
*Assistant Examiner*—Edward M. Johnson
(74) *Attorney, Agent, or Firm*—Oblon, Spivak, McClelland, Maier & Neustadt, P.C.

(57) ABSTRACT

The present invention provides a composting accelerator for a plant-derived material, which accelerator comprises wheat bran and/or low-grade flour powder and an organic waste matter and/or organic fertilizer, and optionally a specific composting assistant; and a compost producing process comprising adding, to a plant-derived material, wheat bran and/or low-grade flour powder and an organic waste matter and/or organic fertilizer and optionally a specific fertilization assistant and carrying out composting.

6 Claims, No Drawings

COMPOSTING ACCELERATOR FOR PLANT-DERIVED MATERIAL

TECHNICAL FIELD

The present invention relates to a composting accelerator useful for accelerating composting of plant-derived materials such as trees or stumps remaining after deforestation for dam or road building in a mountainous region, branches and leaves pruned from planted trees in a green land, roadside or park, withered trees and scrap wood from a building site, thereby producing their compost; and a process for producing the compost of the above-described various plant-derived materials.

BACKGROUND ART

Plant-derived materials such as trees or stumps remaining after deforestation for dam or road building, branches and leaves pruned from planted trees in a green land, roadside or park, withered trees and scrap wood from a building site have conventionally been disposed mainly by thermal disposal or burying under the ground.

Thermal disposal however not only leads to disappearance of the global resources but also promotes the destruction of the environment of the earth by emitting a carbon dioxide gas. In addition, a large amount of smoke troubles neighbors in a densely populated area.

In the disposal by burying under the ground, on the other hand, ligneous organic matters become a hot bed for bacteria causing soil infectious diseases such as white root rot, violet root rot, armillaria root rot and butt rot, thereby disordering plants or become a hot bed for cutworms such as soybean beetle, thereby causing troubles such as weakening or withering of bushes or saplings. In addition, when a raw plant-derived material buried under the ground is decomposed by bacteria or fungus, the bacteria or fungus consumes most of the nitrogen source in the soil because the nitrogen source of the plant-derived material itself is markedly small in amount, which presumably causes nitrogen starvation of plants. Another problem is that lignin, phenol or terpene in the plant-derived material elutes into the soil water and owing to the inhibitory action of it against the growth of a plant root, it brings about a hindrance to the healthy plant growth.

With the forgoing in view, disposal methods of a plant-derived material other than the above-described ones have been investigated and composting of the plant-derived material is considered as one of them.

It however takes several years for composting the above-described plant-derived materials only by depositing it after chipping, because it contains a large amount of sparingly decomposable cellulose and lignin, contains nitrogen sources in a markedly small amount compared with carbon sources and terpene or phenol contained in it is harmful for microorganisms.

A tree from which a plant-derived material appears is formed of five parts, that is, root, trunk, branch, twig and leaf. It has, as main components, cellulose, hemicellulose and lignin and, as secondary components, ash content, nitrogen-containing compound (such as protein), and fat or oil. The cellulose forming the skeleton of it is a linear polymer substance consisting of about 10,000 to 14,000 D-glucose residues in $\beta$-D(1,4) linkage. Some of the residues are strongly bonded and crystallized in a bundle form, thus forming a complex composite with lignin and another polysaccharide so that it has a physically and chemically strong structure difficult to decompose.

An object of the present invention is to provide, for a plant-derived material rich in a sparingly-decomposable component such as cellulose or lignin and therefore unsuited for composting as is, a composting accelerator capable of accelerating the composting of the material, thereby producing its compost in a short period of time.

Another object of the present invention is to provide, for a plant-derived material unsuited for composting as is, a process for accelerating the composting of the material, thereby producing its compost in a short period of time.

DISCLOSURE OF THE INVENTION

With a view to attaining the above-described objects, the present inventors have proceeded with an investigation. As a result, it has been found that the addition of wheat bran and/or low-grade flour powder, and an organic waste matter and/or organic fertilizer to a plant-derived material makes it possible to accelerate the composting of the material and produce its compost in a short period of time. It has also been found that upon composting of the plant-derived material by adding thereto wheat bran and/or low-grade flour powder and the organic waste matter and/or organic fertilizer, further addition of a composting accelerator as described in Japanese Patent Application Hei 10-327611, which is the previous invention by the present inventors, as a composting assistant makes it possible to accelerate the composting of the plant-derived material further and produce its compost in a shorter period of time, leading to the completion of the present invention.

In the present invention, there are thus provided:

(1) a composting accelerator for a plant-derived material, which comprises (A) wheat bran and/or low-grade flour powder and (B) an organic waste matter and/or an organic fertilizer; and (2) a composting accelerator for a plant-derived material, which comprises (A) wheat bran and/or low-grade flour powder, (B) an organic waste matter and/or an organic fertilizer, and (C) a composting assistant which will be described below.

Composting Assistant (i) A composting assistant which contains wheat bran and/or low-grade flour powder and heat-resistant bacteria for assimilating a plant-derived material, and has a pH adjusted within a range of from 6.0 to 8.5, wherein (ii) the wheat bran and/or low-grade flour powder are/is contained in an amount of 60 wt. % or greater based on the total amount of the composting assistant, (iii) the heat-resistant bacteria can survive at 55° C. after treated at 80° C. for 10 minutes and are contained in an amount of $10^5$ CFU or greater in 1 g of the composting assistant, and (iv) a humic acid or a derivative thereof is contained in an amount of 2.5 wt. % or less based on the total weight of the composting assistant.

The present invention embraces, as preferred embodiments:

(3) the composting accelerator as described above in (1) or (2), wherein the weight ratio of [wheat bran and/or low-grade flour powder]:[organic waste matter and/or organic fertilizer] falls within a range of 1:0.1 to 1:60, and (4) the composting accelerator as described above in any one of (1) to (3), wherein the composting assistant is contained in an amount of 0.2 to 300 wt. % based on the total weight of the wheat bran and/or low-grade flour powder and the organic waste matter and/or organic fertilizer.

In addition, (5) the present invention provides a process for producing the compost of a plant-derived material, which comprises adding thereto the composting accelerator as described above in any one of (1) to (4), thereby composting the material.

(6) The present invention embraces, as a preferred embodiment, the compost producing process as described above in (5), wherein the composting accelerator in any one of (1) to (4) is added in an amount of 3.5 to 90 parts by weight based on 100 parts by weight of the plant-derived material.

(7) The present invention also provides a process for producing the compost of a plant-derived material, which comprises adding, to the plant-derived material, (A) wheat bran and/or low-grade flour powder and (B) an organic waste matter and/or an organic fertilizer; or (A) wheat bran and/or low-grade flour powder, (B) an organic waste matter and/or an organic fertilizer and (C) a composting assistant which will be described below, thereby composting the material.

Composting Assistant (i) A composting assistant which contains wheat bran and/or low-grade flour powder and heat-resistant bacteria for assimilating a plant-derived material, and has a pH adjusted within a range of from 6.0 to 8.5, wherein (ii) the wheat bran and/or low-grade flour powder are/is contained in an amount of 60 wt. % or greater based on the total amount of the composting assistant, (iii) the heat-resistant bacteria can survive at 55° C. after treated at 80° C. for 10 minutes and are contained in an amount of $10^5$ CFU or greater in 1 g of the composting assistant, and (iv) a humic acid or a derivative thereof is contained in an amount of 2.5 wt. % or less based on the total weight of the composting assistant.

(8) The present invention embraces, as a preferred embodiment, the compost producing process as described above in (7) wherein 0.5 to 50 parts by weight of the wheat bran and/or low-grade flour powder and 3 to 30 parts by weight of the organic waste matter and/or organic fertilizer are added; or 0.5 to 50 parts by weight of the wheat bran and/or low-grade flour powder, 3 to 30 parts by weight of the organic waste matter and/or organic fertilizer and 0.1 to 10 parts by weight of the above-described composting assistant are added, each based on 100 parts by weight of the plant-derived material.

In addition, (9) the present invention embraces, as a preferred embodiment, the compost producing process as described above in any one of (5) to (8), wherein the plant-derived material is in the chipped form.

THE BEST MODES FOR CARRYING OUT THE INVENTION

The present invention will hereinafter be described specifically.

The term "plant-derived material" as used herein means a plant material derived from trees including roots, trunks, branches and twigs. Specific examples include trees or stumps remaining after deforestation for dam or road building in a mountainous region, branches and leaves pruned from trees planted in a green land, roadside or park, withered trees and scrap wood from a building site. Sometimes, fallen leaves and mowed grasses or lawn are included. The composting accelerator or compost producing process according to the present invention is useful for any one of the above-described plant-derived materials. Upon composting and production of the compost of the above-described plant-derived materials, it is preferred to chip them into a size of about 2 to 8 cm in advance for uniform and speedy composting.

In the composting accelerator or compost producing process according to the present invention, wheat bran and/or low-grade flour powder is employed as the first component [component (A)].

Wheat bran is a protective seed coat of the wheat kernel, while low-grade flour powder contains the endosperm (wheat flour) attached to the protective seed coat of the kernel and wheat bran. Each of them is available as a by-produce in wheat milling.

For the composting accelerator or compost producing process according to the present invention, wheat bran and low-grade flour powder may be used either singly or in combination, as the component (A).

The reason why the wheat bran or low-grade flour powder has excellent proliferation accelerating effects for a plant-derived material is not clear, but is presumed to be as follows:

Proliferation of bacteria indigenous to the plant-derived material, organic waste matter and/or organic fertilizer becomes active at the portion of the wheat bran and/or low-grade flour powder, and heat emission therefrom owing to the proliferation raises the temperature of the plant-derived material around this portion, whereby the bacteria indigenous to the plant-derived material, organic waste matter and/or organic fertilizer become more active and emit heat. This heat emission extends the activation site of the indigenous bacteria, which causes further heat emission. Such a chain reaction accelerates composting. The composting due to the activation of the indigenous bacteria is accompanied with generation of ammonia, which increases the pH of the composted material to an alkaline side suited for the activity of the indigenous bacteria and thereby promotes the activity of microorganisms, whereby the humification of the plant-derived material is presumed to proceed.

In the composting accelerator or compost producing process according to the present invention, an organic waste matter and/or organic fertilizer is employed as a second component [component (B)].

Examples of the organic waste matter include livestock excrement such as poultry dung, for example, fowl dung, swine dung, cattle dung, horse dung and sheep dung; and organic sludge. They may be used either singly or in combination. Among them, fowl dung and swine dung are preferred from the viewpoints of their composting accelerating effects for a plant-derived material and easy availability.

As the organic fertilizer employed as the component (B), any organic fertilizer obtained by composting of an organic raw material can be used. Examples include organic fertilizers obtained by composting an organic raw material to be composted such as livestock excrement, food remnants and activated sludge; and composts of a plant-derived material obtained by the compost producing process of the present invention. They may be used either singly or in combination. Among them, organic fertilizers obtained by composting of livestock excrement are preferred from the viewpoints of their composting accelerating effects for a plant-derived material and easy availability.

In the composting accelerator or compost producing process according to the present invention, the organic waste matter and organic fertilizer may be used either singly or in combination.

By the use of, as the organic waste matter and/or organic fertilizer constituting the component (B), a dried one having a small water content, or a dried one in the powdery or granular form, the offensive odor and handling ease of the composting accelerator of the present invention available by mixing of the component (A) (wheat bran and/or low-grade flour powder) and the component (B) (organic waste matter and/or organic fertilizer), and optionally the component (C) (composting assistant) can be reduced and improved, respectively.

The organic waste matter and/or organic fertilizer used as the component (B) in the present invention is presumed to exhibit excellent composting accelerating effects for a plant-derived material because of the following reason:

The plant-derived material itself has a high C/N ratio so that if it is used alone, microorganisms in it are not so active as to cause brisk decomposition or humification of organic matters contained in the material. The organic waste matter or organic fertilizer has, on the other hand, a C/N ratio of about 10 to 20 on average. The addition of such an organic waste matter and/or organic fertilizer to the plant-derived material lowers the C/N ratio to a suitable one for the activities of microorganisms. The microorganisms in the plant-derived material are thus activated, which is presumed to promote the decomposition and humification of the organic matters in the plant-derived material.

In the composting accelerator or compost producing process according to the present invention, it is possible to add as needed, to a plant-derived material, the above-described composting assistant as a third component [component (C)], together with the above-described components (A) and (B). Use of the composting assistant in combination with the components (A) and (B) promotes the composting of the plant-derived material further, making it possible to convert it into an organic fertilizer (compost) having a high fertilizing efficiency in a shorter period of time.

As described above, the composting assistant preferably used in the present invention (i) contains wheat bran and/or low-grade flour powder and heat-resistant bacteria for assimilating a plant-derived material, and has a pH adjusted within a range of from 6.0 to 8.5, and in it, (ii) the wheat bran and/or low-grade flour powder are contained in an amount of 60 wt. % or greater based on the total amount of the composting assistant, (iii) the heat-resistant bacteria can survive at 55° C. after treated at 80° C. for 10 minutes and are contained in an amount of $10^5$ CFU or greater in 1 g of the composting assistant, and (iv) a humic acid or derivative thereof is contained in an amount of 2.5 wt. % or less based on the total weight of the composting assistant.

Specific examples of the heat-resistant bacteria which are added to the composting assistant and can assimilate a plant-derived material include bacteria belonging to the genus Bacillus such as *Bacillus subtilis, Bacillus cereus, Bacillus coagulans* and *Bacillus stearothermophilus,* thermophylic genus Actinomyces such as *Thermoactinomyces vulgaris* and *Thermomonospora curvara* and thermophylic mold such as *Humicola insokens* and *Talaromyces dupontii.* The composting assistant can contain one or more than one of these heat-resistant bacteria.

The above-described heat-resistant bacteria can survive at 55° C. after treated at 80° C. for 10 minutes and have excellent assimilating capacity for a plant-derived material.

From the viewpoints of composting accelerating effects for a plant-derived material, the composting assistant preferably contains the above-described heat-resistant bacteria in an amount of $10^5$ CFU (colony forming unit) or greater per g of it, with an amount of $10^6$ CFU or greater being more preferred.

The CFU of the heat-resistant bacteria in the present invention means the number of colonies formed when the composting accelerator is cultured on a standard agar medium for 48 hours in a thermostat of 55° C., which will be described more specifically later in Examples.

Examples of the humic acid or derivative contained in the composting assistant include alkali-soluble, amorphous polymeric organic acids contained in the young coal such as lignite or peat having a low coalification degree, nitrohumic acids available by oxidative destruction of the amorphous polymeric organic acid with nitric acid and salts of such nitrohumic acids, and young coal such as lignite or peat containing a humic acid. Among them, as the humic acid or derivative contained in the composting accelerator, humic acids separated from lignite or peat, and nitrohumic acids and salts thereof are preferred from the viewpoint of the composting accelerating effects.

The composting assistant is available by mixing wheat bran and/or low-grade flour powder, the above-described heat-resistant bacteria, and the humic acid or derivative thereof and, if necessary, a pH regulator to give the pH of the resulting mixture within a range of 6.0 to 8.5.

The details of the composting assistant preferably employed in the present invention are described in the specification of Japanese Patent Application No. Hei 10-327611 and the "composting accelerator" as described therein corresponds to the composting assistant of the present invention.

In the composting accelerator or compost producing process of the present invention, it is possible to add, in addition to the above-described components, another component if necessary in an amount of 40 wt. % or less, preferably 20 wt. % or less based on the total weight of the components (A) and (B). Examples of the another component include minerals such as vermiculite, pearlite, zeolite and diatomaceous earth; and organic materials, other than wheat bran or low-grade flour powder, such as rice bran, corn husk and sawdust.

In the present invention, a compost can be produced either by mixing the components (A) and (B), and optionally the component (C) and another component in advance to prepare the composting accelerator of the present invention, adding the resulting composting accelerator to a plant-derived material and then carrying out composting, or by adding each of the component (A) and the component (B), and optionally the component (C) and another component directly to a plant-derived material and then, carrying out composting.

In the former process, there is no particular limitation imposed on the preparation process of the composting accelerator. Any process permitting uniform mixing of the components (A) and (B) and optionally the component (C) and another component can be employed. In general, the composting accelerator of the present invention can be prepared easily only by mixing the above-described components at room temperature and moreover, the resulting mixture can easily be pelletized.

The composting accelerator thus available is convenient, because it does not require weighing or mixing of the components at the using site and only the direct addition of it to a plant-derived material, followed by composting enables smooth compost production of the plant-derived material in a short period of time.

The composting accelerator of the present invention contains the components (A) and (B) preferably at a weight ratio of (A):(B) ranging from 1:0.1 to 1:60, more preferably from 1:1 to 1:20, from the viewpoint of the composting acceleration effects for a plant-derived material and preparation of a good-quality compost free from plant growth inhibition.

When the composting accelerator contains the component (C) (composting assistant), together with the components (A) and (B), the component (C) is contained preferably at a weight ratio of 0.2 to 300 wt. %, more preferably 2.5 to 100 wt. % based on the total weight of the components (A) and (B), from the viewpoints of the composting acceleration effects and preparation of a good-quality compost free from plant growth inhibition.

Upon composting and production of the compost of a plant-derived material by adding thereto the composting accelerator of the present invention, it is preferred to add the composting accelerator in an amount of 3.5 to 90 parts by weight, more preferably 7 to 45 parts by weight based on 100 parts by weight of the plant-derived material from the viewpoints of composting acceleration effects and preparation of a good-quality compost free from plant growth inhibition. Amounts of the composting accelerator less than 3.5 parts by weight based on 100 parts by weight of the plant-derived material are insufficient for the acceleration of the composting, which requires a long composting time. Although amounts of the composting accelerator exceeding 90 parts by weight, based on 100 parts by weight of the plant-derived material, are harmful for neither composting nor compost production, they cause a cost increase and are therefore inadvisable.

In order to heighten the composting accelerating effects and to prepare a good-quality compost free from plant growth inhibition, it is preferred to compost a plant-derived material, thereby producing its compost by adding, to 100 parts by weight of it, 0.5 to 50 parts by weight, particularly 1 to 20 parts by weight, of the component (A) (wheat bran and/or low-grade flour powder); 3 to 30 parts by weight, particularly 5 to 20 parts by weight, of the component (B) (organic waste matter and/or organic fertilizer) and optionally 0.1 to 10 parts by weight, particularly 1 to 5 parts by weight, of the component (C) (composting assistant). When the amount of the component (A) is less than 0.5 part by weight and/or the amount of the component (B) is less than 3 parts by weight, each based on 100 parts by weight of the plant-derived material, the composting of the plant-derived material is not accelerated fully, which requires a long time for compost production. Amounts of the component (A) exceeding 50 parts by weight or amounts of the component (B) exceeding 30 parts by weight, each based on 100 parts by weight of the plant-derived material, are not advisable, because although they do not have any harmful influence on the composting or compost production, excessive use of the component (A) or (B) causes a cost increase and in addition, excessive use of the component (B) leads to emission of a malodor.

In the case where composting and compost production are conducted by directly and separately adding, to a plant-derived material, the component (A) (wheat bran and/or low-grade flour powder), the component (B) (organic waste matter and/or organic fertilizer) and optionally the component (C) (composting assistant), it is preferred to add, to 100 parts by weight of the plant-derived material, 0.5 to 50 parts by weight, particularly 1 to 20 parts by weight, of the component (A); 3 to 30 parts by weight, particularly 5 to 20 parts by weight, of the component (B) and optionally 0.1 to 10 parts by weight, particularly 1 to 5 parts by weight, of the component (C).

There is no particular limitation imposed on the composting conditions upon production of the compost of the plant-derived material. Any conditions permitting smooth composting of it can be employed. Among them, the following conditions are suited. Described specifically, a compost (organic fertilizer) having high fertilizing efficiency and excellent quality can be produced smoothly in a short period of time (usually, about 1.5 to 4 months), by adding, to the plant-derived material, the composting accelerator or the components (A) and (B) and optionally the component (C) separately; uniformly mixing them, adjusting the water content of the resulting mixture to about 50 to 70 wt. %, and depositing it into the shape of a ridge, pyramid, mountain or trapezoid, and if necessary keeping aerobic conditions by stirring (cutting and mixing). The above-described cutting and mixing works about once in 2 to 4 weeks are usually sufficient. Particularly when the mixture is deposited into the shape of a ridge, it is possible to smoothly compost it without cutting and mixing works if the ridge is formed to have a size permitting not heat emission but supply of oxygen into the center of the ridge. When the ridge is formed to face a larger part of it to south, much exposure to sun accelerates composting.

The organic fertilizer available by the composting of the plant-derived material according to the present invention has a reduced offensive or foreign odor and contains the plant-derived material in the markedly decomposed form so that it can be reduced to the soil as is. It is particularly useful as a fertilizer for planting on a sloped road or bank.

EXAMPLES

The present invention will hereinafter be described more specifically by Examples. It should however be borne in mind that the present invention is not limited to or by them. In the below-described Examples, the maximum temperature upon composting (upon production of a compost) and a weight loss after composting were determined by the following methods.

[Measurement of the Maximum Temperature upon Composting (upon Production of a Compost)]

Upon composting, a temperature sensor was inserted in 20 cm downward from the surface of a deposit layer and a time-dependent change of the temperature was measured by a temperature recorder ("Temperature Collector AM7012", manufactured by Anritsu Meter Co., Ltd.), whereby the maximum temperature was determined.

[Weight Loss after Composting]

The weight loss after composting was determined in accordance with the following equation:

$$\text{Weight loss (\%) after composting} = \{(Wa-Wb)/Wa\} \times 100$$

wherein,
Wa=total weight of a plant-derived material (bark chip) and composting accelerator before composting
Wb=total weight of a plant-derived material (bark chip) and composting accelerator after composting (weight of the composted material)

Referential Example 1
[Preparation of a Composting Assistant]

Wheat bran (1000 g), 54 g of a microorganism material ("BST-9", produced by Takeda Kagaku Shiryo Co., Ltd.; containing heat resistant bacteria such as *Bacillus subtilis* for assimilating an organic material in an amount of $1 \times 10^8$ CFU per g of the microorganism material), 11 g of a nitrohumic acid ("NHA" produced by TELNITE Co., Ltd.), and 11 g of calcium carbonate as a pH regulator were mixed uniformly, whereby a composting assistant (pH: 7.0, containing heat-resistant bacteria in an amount of $5 \times 10^6/1$ g of the composting assistant) was prepared.

The viable count of the heat resistant bacteria in the microorganism material used for the above-described preparation was measured as follows:

[Measurement of the Viable Count of Heat-resistant Bacteria in a Microorganism Material]

The microorganism material sample (1 g) was diluted with 9 ml of sterilized water, followed by dilution, depending on the viable count (plate dilution method). After the mixture was kept at 80° C. for 10 minutes, it was smeared on a standard agar medium ("Pearl Core", produced by Eiken Chemical Co., Ltd.) and cultured in a thermostat of 55° C. for 2 days. The number of the colonies on the medium was counted, whereby the viable count of heat-resistant bacteria per g of the microorganism material was determined.

Example 1
[Composting and Production of the Compost of a Plant-derived Material (Bark Chip)]

Bark was pulverized into chips of a size of about 10 mm or less (which chips will hereinafter be called "bark chips"), with which wheat bran and composted fowl dung (organic fertilizer obtained by composting of fowl dung) were mixed at a ratio as shown below in Table 1. After the resulting mixture was adjusted to have a water content of 60 wt. %, it was filled in a 40-litter Styrofoam container to a height of about 50 cm and then allowed to stand indoors (at about 14 to 30° C.) for 26 days for composting. During the composting, the temperature of the composted material was measured with the passage of time and the maximum temperature was determined. The results are as shown in Table 1. In addition, a weight loss of the composted material (plant-derived material) on Day 26 was found based on the above-described method. The results are also shown in Table 1.

TABLE 1

| Test No. | Bark chips | What bran | Composted fowl dung | Maximum Temp. upon composting | Weight loss on Day 26 |
|---|---|---|---|---|---|
| 1 | 17.70 kg (100 parts) | 0 kg (0 part) | 0.89 kg (5 parts) | 28.4° C. | 6.14% |
| 2 | 17.53 kg (100 parts) | 0.18 kg (1 part) | 0.88 kg (5 parts) | 34.5° C. | 6.19% |
| 3 | 16.89 kg (100 parts) | 0.85 kg (5 parts) | 0.85 kg (5 parts) | 46.9° C. | 8.97% |
| 4 | 16.16 kg (100 parts) | 1.62 kg (10 parts) | 0.81 kg (5 parts) | 47.2° C. | 11.89% |
| 5 | 14.88 kg (100 parts) | 2.97 kg (20 parts) | 0.74 kg (5 parts) | 51.9° C. | 17.00% |
| 6 | 13.77 kg (100 parts) | 4.13 kg (30 parts) | 0.69 kg (5 parts) | 51.0° C. | 20.13% |
| 7 | 12.82 kg (100 parts) | 5.13 kg (40 parts) | 0.64 kg (5 parts) | 52.8° C. | 21.01% |

From the above-described results in Table 1, it has been found that the maximum temperature upon composting was higher and a weight loss of the composted material was larger in Test Nos. 2 to 7 wherein wheat bran and composted fowl dung were added to compost the plant-derived material (bark chips), compared with those in Test No. 1 wherein not wheat bran but only composted fowl dung was added to compost the plant-derived material (bark chips), indicating that the composting was accelerated in the former case. The larger the amount of wheat bran relative to the amount of the plant-derived material (bark chips), the higher the maximum temperature and the larger the weight loss became and the more the composting was accelerated.

Example 2
[Composting and Compost Production of a Plant-derived Material (Bark Chips)]

With the bark chips similar to those used in Example 1, wheat bran, composted fowl dung and the composting assistant prepared in Referential Example 1 were mixed at a ratio as shown below in Table 2. After adjustment of the water content of the resulting mixture to 65 wt., it was filled in a 20-litter Styrofoam container to a height of about 25 cm and then allowed to stand indoors for 7 days for composting. During the composting, the temperature of the composted material was measured with the passage of time and the maximum temperature was determined. The results are shown in Table 2. In addition, a weight loss of the composted material (plant-derived material) on Day 7 was found based on the above-described method. The results are also shown in Table 2.

TABLE 2

| Test No. | Bark chips | What bran | Composted fowl dung | Compositing assistant | Maximum Temp. upon compositing | Weight loss on Day 7 after compositing |
|---|---|---|---|---|---|---|
| 8 | 8.03 kg (100 parts) | 0.24 kg (3 parts) | 0.40 kg (5 parts) | 0 kg (0 part) | 41.8° C. | 6.80% |
| 9 | 8.07 kg (100 parts) | 0.24 kg (3 parts) | 0.40 kg (5 parts) | 0.08 kg (1 part) | 45.2° C. | 7.82% |

From the above-described results in Table 2, it has been found that the maximum temperature upon composting was higher and a weight loss of the composted material on Day 7 was larger in Test No. 9 wherein wheat bran, composted fowl dung and composting assistant were added to the plant-derived material (bark chips) to compost it than those in Test No. 8 wherein only wheat bran and composted fowl dung were added, indicating that the composting of the plant-derived material (bark chips) was accelerated in the former case.

Example 3
[Composting and Compost Production of a Plant-derived Material (Chips of a Stump Remaining after Deforestation]

(1) A stump remaining after deforestation was pulverized into chips of 75 mm or less (which will hereinafter be called "stump chips"), with which wheat bran and composted fowl dung (organic fertilizer obtained by the composting of fowl dung) were mixed at a ratio as shown below in Table 3. After adjustment of the water content of the resulting mixture to 60 wt. %, it was deposited outdoors into a shape of a truncated cone (bottom diameter: about 2.5 m, diameter of the upper surface: about 0.8 m, height: about 1.2 m, volume: about 2.8 m$^3$, weight: about 120 kg) and allowed to stand for 100 days for composting to obtain a compost (Test Nos. 10 to 13). The outdoor temperature during the composting for 100 days fell within a range of about −8.2 to 22.4° C.

(2) Since it is the common practice to spray the fertilizer of stump chips to a slope after sifting, each of the composted materials obtained in Test Nos. 10 to 13 was collected with the passage of time during the composting period of (1) and sifted through a sieve having an opening of 5 mm. The material which passed through the sieve was collected and its composting condition (composted degree; fertilizing efficiency) was evaluated by the "tea pollen tube test".

[Evaluation According to the Results of Tea Pollen Tube Test]

(i) To 30 g (dry weight) of the fertilizer of stump chips obtained above in (2) by sifting through a sieve having an opening of 5 mm, 300 ml of water was added to extract it under shaking at normal temperature for 1 hour. The resulting extract (100 parts by weight) was diluted with 250 parts by weight of water, followed by the addition of 8 wt. % of sucrose and 1.2 wt. % of agar. To the resulting mixture, 17 mg/liter of boron was added to adjust its pH to 5.5. After dissolution under heating, the solution was poured into a Petri dish and solidified, whereby a medium was prepared for each of the composted materials collected with the passage of time.

(ii) A medium for control was prepared by adding 8 wt. % of sucrose and 1.2 wt. % of agar to water, adding boron to the resulting mixture in an amount of 17 mg/liter to adjust the pH of the resulting mixture to 5.5, pouring it in a Petri dish after dissolution under heating, and then solidifying the solution.

(iii) Tea pollen was scraped uniformly by a cover glass and radially placed on each of the media prepared in (i) and (ii). It was then cultured in a dark place of 25° C. and after 20 hours, the growth of the tea pollen tube (average length of the teat pollen tube) was observed.

In Test Nos. 10 to 13, when the growth of the tea pollen tube became 80 or greater (the growth rate relative to control: 80% or greater) supposing that the growth of the tea pollen tube (average length of the tea pollen tube) on the control medium was 100, composting was evaluated to be sufficient. The results are as shown below in Table 3.

TABLE 3

| Test No. | Stump chips | Wheat bran | Composted fowl dung | Tea pollen tube test (the day when the growth rate of a tea pollen tube became 80% or greater relative to that of control) |
|---|---|---|---|---|
| 10 | 1120 kg (100 parts) | 0 kg (0 part) | 0 kg (0 part) | At least 100 days after initiation of composting |
| 11 | 1120 kg (100 parts) | 0 kg (0 part) | 56 kg (5 parts) | On Day 93 after initiation of composting |
| 12 | 1120 kg (100 parts) | 56 kg (5 parts) | 0 kg (0 part) | On Day 99 after initiation of composting |
| 13 | 1120 kg (100 parts) | 56 kg (5 parts) | 56 kg (5 parts) | On Day 51 after initiation of composting |

As apparent from the above-described results in Table 3, in Test No. 13 wherein composting was conducted by adding wheat bran and composted fowl dung to the plant-derived material (stump chips), the growth rate of the tea pollen tube has already reached at least 80% on Day 51 after initiation of composting. In Test No. 10 wherein composting was conducted without adding wheat bran and composted fowl dung to the plant-derived material (stump chips), on the other hand, the growth rate of the tea pollen tube did not reach 80% or greater even on Day 100 after initiation of composting. In Test No. 11 wherein composting was conducted by the addition of only composted fowl dung and in Test No. 12 wherein composting was conducted by the addition of only wheat bran, the growth rate of the tea pollen tube reached 80% or greater on Day 93 and Day 99 after the initiation of composting, respectively, indicating that the composting accelerating effects are much inferior to that in Test No. 13 wherein the composting was conducted by the addition of wheat bran and composted fowl dung. In other words, the composting time of the plant-derived material (stump chips) in Test No. 13 is reduced to ½ or less of that in Test No. 10, about ⅗ or less of that in Test No. 11 and about ½ of that in Test No. 12.

CAPABILITY OF EXPLOITATION IN INDUSTRY

By the addition of the composting accelerator of the present invention or by the application of the composting process of the present invention, various plant-derived materials, which are otherwise unsuited for composting because of a high content of a sparingly decomposable substance such as cellulose or lignin and are therefore thermally disposed or buried under the ground conventionally, can be composted smoothly in a short time and converted into an organic fertilizer having high fertilizing efficiency. The present invention therefore contributes to the protection of the environment of the earth and effective utilization of resources.

What is claimed is:

1. A composting accelerator for a plant-derived material, which comprises (A) wheat bran and/or low-grade flour powder, (B) an organic waste matter and/or an organic fertilizer, and (C) a composting assistant which
   (i) contains wheat bran and/or low-grade flour powder and heat-resistant bacteria for assimilating a plant-derived material, and has a pH adjusted within a range of from 6.0 to 8.5,
   (ii) the wheat bran and/or low-grade flour powder in said composting assistant (C) are contained in an amount of 60 wt. % or greater based on the total amount of the composting assistant,
   (iii) the heat resistant bacteria can survive at 55° C. after treated at 80° C. for 10 minutes and are contained in an amount of $10^5$ CFU or greater in 1 g of the composting assistant, and
   (iv) a humic acid or derivative thereof is contained in an amount of 2.5 wt. % or less based on the total weight of the composting assistant.

2. A composting accelerator according to claim 1, wherein the weight ratio of: in (A) falls within a range of 1:0.1 to 1:60.

3. A composting accelerator according to claim 1, wherein the composting assistant is contained in an amount of 0.2 to 300 wt. % based on the total weight of the wheat bran and/or low-grade flour powder and the organic waste matter and/or organic fertilizer in (A).

4. A process for producing a compost of a plant-derived material, which comprises adding a composting accelerator as claimed in claim 1 to a plant-derived material, thereby composting said material.

5. A compost producing process according to claim 4, wherein in (A) 0.5 to 50 parts by weight of the wheat bran and/or low-grade flour powder and 3 to 30 parts by weight of the organic waste matter and/or organic fertilizer are added; and 0.1 to 10 parts by weight of composting assistant (C) are added, each based on 100 parts by weight of the plant-derived material.

6. A compost producing process according to claim 4, wherein the plant-derived material is in chipped form.

* * * * *

UNITED STATES PATENT AND TRADEMARK OFFICE
CERTIFICATE OF CORRECTION

PATENT NO.    : 6,383,246 B1                                          Page 1 of 1
DATED         : May 7, 2002
INVENTOR(S)   : Konishi et al.

It is certified that error appears in the above-identified patent and that said Letters Patent is hereby corrected as shown below:

Column 12,
Line 64, "ratio of:  in (A)" should read -- ratio of: [wheat bran and/or low-grade flour powder]:[organic waste matter and/or organic fertilizer] in (A) --.

Signed and Sealed this

Thirteenth Day of May, 2003

JAMES E. ROGAN
*Director of the United States Patent and Trademark Office*